(12) United States Patent  (10) Patent No.: US 6,530,263 B1
Chana  (45) Date of Patent: Mar. 11, 2003

(54) METHOD AND SYSTEM FOR LOCALIZING AND CORRELATING LEAKS IN FLUID CONVEYING CONDUITS

(75) Inventor: Gurcharan Singh Chana, Eastleigh (GB)

(73) Assignee: Radcom Technologies LTD, Southampton (GB)

( * ) Notice: Subject to any disclaimer, the term of this patent is extended or adjusted under 35 U.S.C. 154(b) by 0 days.

(21) Appl. No.: 09/772,589

(22) Filed: Jan. 30, 2001

Related U.S. Application Data

(60) Provisional application No. 60/236,766, filed on Sep. 29, 2000.

(51) Int. Cl.⁷ .......................... G01M 3/24; G01M 3/00; G01S 3/80; G06G 7/57
(52) U.S. Cl. ................. 73/40.5 R; 73/40.5 A; 73/592
(58) Field of Search .......... 73/40.5 R, 40.5 A, 73/592

(56) References Cited

U.S. PATENT DOCUMENTS

| | | | |
|---|---|---|---|
| 4,083,229 A | | 4/1978 | Anway ................ 73/40.5 A |
| 4,858,462 A | * | 8/1989 | Coulter et al. ........ 73/40.5 A |
| 5,205,173 A | | 4/1993 | Allen ................... 73/592 |
| 5,272,646 A | * | 12/1993 | Farmer ................ 364/509 |
| 5,333,501 A | * | 8/1994 | Okada et al. .......... 73/592 |
| 5,343,737 A | * | 9/1994 | Baumoel ............... 73/40.5 R |
| 5,349,568 A | * | 9/1994 | Kupperman et al. ..... 367/125 |
| 5,428,989 A | * | 7/1995 | Jerde et al. ........... 73/40.5 R |
| 5,531,099 A | * | 7/1996 | Russo .................. 73/40.5 A |
| 5,544,074 A | * | 8/1996 | Suzuki et al. .......... 364/508 |
| 5,548,530 A | * | 8/1996 | Baumoel ............... 364/509 |
| 5,675,506 A | * | 10/1997 | Savic .................. 364/509 |
| 5,708,195 A | * | 1/1998 | Kurisu ................. 73/40.5 R |
| 5,922,942 A | * | 7/1999 | Roy .................... 73/40.5 A |
| 5,974,862 A | * | 11/1999 | Lander et al. ......... 73/40.5 A |

\* cited by examiner

Primary Examiner—Hezron Williams
Assistant Examiner—David J. Wiggin
(74) Attorney, Agent, or Firm—Kriegsman & Kriegsman

(57) ABSTRACT

A system for localizing and correlating leaks in a pipeline includes a plurality of loggers for detecting and storing sound data, an interface unit removably connected to the plurality of loggers and a computer system removably connected to the interface unit. Each logger includes a housing and electronics disposed within the housing, the electronics comprising a microprocessor for controlling the operation of the logger, a battery source for powering the logger, a sound sensor for detecting sound data and data storage circuitry for storing sound data detected by the sound sensor. In use, the plurality of loggers are disposed along the pipeline and are programmed to record sound data. The sound data recorded by the plurality of loggers is downloaded onto the computer system which, in turn, localizes and correlates any leaks present in the pipeline.

19 Claims, 6 Drawing Sheets

METHOD AND SYSTEM FOR LOCALIZING AND CORRELATING LEAKS IN FLUID CONVEYING CONDUITS

This application claims the benefit of No. 60/236,766, filed Sep. 29, 2000.

BACKGROUND OF THE INVENTION

The present invention relates generally to methods and apparati for detecting leaks in fluid conveying conduits, and more particularly to methods and apparati for detecting and accurately locating the position of leaks in fluid conveying conduits which are buried underground or otherwise inaccessible for inspection.

Fluid conveying conduits, such as water distribution pipelines, commonly experience leaks. To complicate matters, because fluid conveying conduits are commonly buried underground or are otherwise unexposed or inaccessible, leaks produced by such conduits often do not surface and, therefore, are not detected. As a result, fluid conveying conduits can often experience leaks for prolonged periods of time, such one or more years, without ever being detected, which is highly undesirable.

Accordingly, a multi-stage inspection process is commonly performed in the art to localize and correlate leaks in fluid conveying conduits.

Specifically, in the primary stage, a general surveying, or localization, mode is commonly executed to determine the presence of leaks in a conduit, such as a pipeline. Leak localization is commonly achieved by monitoring the flow of the fluid into and out of a district metered area (DMA), by monitoring minimum night flow of the fluid, or by utilizing sound loggers to detect when the noise produced by the fluid exceeds a pre-determined threshold.

In the secondary stage, a more detailed correlation mode is commonly executed to determine the exact location of the leaks in the underground fluid conveying conduit. Specifically, correlators are commonly used on the surface above an underground pipeline or directly upon an easily accessible, external device, such as a valve or hydrant, in order to more accurately determine the position of leaks in the conduit. After correlators are used to determine the position of the leaks, the ground directly above the leaks is excavated so that the leaks can be repaired. As can be appreciated, by knowing the exact location of the leaks in the conduit, excavation can be limited to only the portion of the street surface which is directly above the leaks, thereby reducing excavation costs and repair time, which is highly desirable.

Correlators commonly utilize sound technology to determine the location of leaks. Specifically, it is well known that a fluid, such as water, which escapes from a pressurized conduit, such as a pipeline, produces a high frequency sound wave that is propagated along the conduit with a constant velocity in both directions away from the source of the leak. It is also well known that, by placing a pair of sensors on opposite sides of the leak, the leak noise will be received at the sensors at different times depending upon the distance of each sensor from the source of the leak. Since the propagating velocity of the sound wave can be easily calculated, the location of the leak in the pipeline can be determined as a function of the time difference in which each sensor detects the sound wave.

In U.S. Pat. No. 4,083,229 to A. R. Anway, there is disclosed a method and apparatus for detecting and locating a fluid leak in an underground pipe or the like in which the vibration produced by the leak is intercepted at selected spaced apart points by microphones or other transducers, in which the vibration intercepted at each of the two points in converted into an electrical signal, and in which the extent of correlation of the two resulting signals is varied by variably time delaying one signal relative to the other to determine the leak's location fro the occurrence of maximum correlation between the signals. In one embodiment, the variable time delay of one signal relative to the other is accomplished by a variable length time delay line and a means for progressively varying the length of the delay line. In another embodiment, the variable time delay is accomplished by a recirculating delay line analyzer that does more data age comparisons with the same delays in the same time than the variable length delay line.

The method and apparatus for detecting and locating a fluid leak in an underground pipe disclosed in the aforementioned patent to Anway utilizes a cross-correlation measurement technique in which one signal is progressively delayed relative to the other while the apparatus continues to compare the similarity between the two signals. This enables the device to measure the difference in travel time $T_d$ of the leak noise to the respective sensors. By determining the velocity of sound for the particular pipeline and knowing the distance between the sensors, the apparatus can compute the leak position in accordance with the following formula:

$$L=[D-(V\times T_d)]/2$$

where L is the leak position relative to one sensor, D is the overall distance between the sensors, V is the velocity of sound in the pipeline medium, and $T_d$ is the transit time difference.

In U.S. Pat. No. 5,205,173 to T. J. Allen, there is disclosed an improved method and apparatus for detecting leaks in pipelines using cross-correlation techniques including improved correlating circuitry featuring a pair of circulating delay lines for respectively receiving, temporarily storing and processing in a revolving sequence, samples of input data obtained from a pair of remotely positioned sensors, a multiplying circuit for causing samples input to each channel to be multiplied by each sample stored in the circulating delay line associated with the other channel, an adder and accumulator memory for accumulating the multiplication results, and a display for displaying the correlation results.

Although well known and widely used in commerce, prior art methods and apparati for detecting and locating fluid leaks in underground conduits suffer from notable drawbacks.

As an example, prior art methods and apparati for detecting and locating fluid leaks in underground conduits typically need to analyze the sound data obtained by the pair of sensors in real time. Specifically, the sound data detected by the sensors is transmitted to a central correlating unit via a communications link, such as radio or hard wire links. The data transmitted to the central correlating unit is then analyzed in real time by a correlation workforce, the real time analysis ensuring that the sound data detected by the sensors is synchronized in time. As a result, because the sound data must be analyzed in real time, the data can not be used in repeat correlations or comparisons after repair work has been carried out on the site of the leaks. In addition, because the sound data must be analyzed in real time, a constant correlation workforce is required during the accumulation of sound data by the sensors, thereby increasing expenses and operation time, which is highly undesirable.

As another example, although well known and widely used in commerce, the conventional multi-stage inspection process described above for localizing and correlating leaks in fluid conveying conduits is typically accomplished using different equipment and different workforces, thereby increasing equipment and labor costs, which is highly undesirable.

As another example, prior art methods and apparati for detecting and locating a fluid leak in underground fluid conveying conduits typically require that a fixed delay be introduced into one of the sound data streams, thereby increasing the total analysis time, which is highly undesirable.

As another example, prior art methods and apparati for detecting and locating a fluid leak in underground fluid conveying conduits typically fail to compensate for variances in the ambient temperature, thereby compromising the accuracy of the calculation of the location of the source of leaks in the pipeline, which is highly undesirable.

As another example, prior art methods and apparati for detecting and locating a fluid leak in underground conduits typically analyze one set of sound data, which can be unreliable. Specifically, temporary noise can be created in the pipeline during moments of increased fluid usage and, as a result, can create inaccuracies in the detection and location of leaks in the pipeline, which is highly undesirable.

As another example, prior art methods and apparati for detecting and locating a fluid leak in underground conduits are typically capable of utilizing only two sensors during the sound data collection period, thereby limiting the speed and efficiency in which a pipeline may be inspected, which is highly undesirable.

SUMMARY OF THE INVENTION

It is an object of the present invention to provide a new and improved method and system for localizing and correlating leaks in fluid conveying conduits.

It is another object of the present invention to provide a method and system for localizing and correlating leaks in fluid conveying conduits using compiled sound data.

It is yet another object of the present invention to provide a method and system for correlating leak noise sound data to accurately pinpoint the position of one or more leaks.

It is still another object of the present invention to provide a method and system of the type described above wherein the compiled sound data is stored in memory for the future localization and correlation of leaks.

It is another object of the present invention to provide a method and system of the type described above which compensates for variances in the ambient temperature.

It is yet another object of the present invention to provide a method and system of the type described above which compiles sound data over multiple time slices.

It is still another object of the present invention to provide a method and system of the type described above which is inexpensive to manufacture and unobtrusive to use.

Accordingly, as one feature of the present invention, there is provided a system for localizing and correlating at least one leak in at least one fluid conveying conduit, said system comprising first and second loggers which are positioned along the fluid conveying conduit in a spaced apart relationship, said first and second loggers being adapted to detect and store sound data produced within the at least one fluid conveying conduit, an interface unit removably connected to said first and second loggers, and a computer system removably connected to said interface unit, wherein the sound data stored by said plurality of loggers is capable of being downloaded onto said computer system, said computer system being capable of using the sound data to localize and correlate the at least one leak in the at least one conduit here is provided a dental cast tray assembly for forming a dental cast model, comprising a base, and a tray removably mounted on said base, said tray comprising a bottom surface and a top surface, the top surface being recessed so as to form an enclosed reservoir for holding the dental cast model.

As another feature of the present invention, there is provided, a method for correlating at least one leak in at least one fluid conveying conduit using a plurality of sound data loggers, each sound data logger being adapted to detect and store sound data produced within the at least one fluid conveying conduit, said method comprising the steps of programming the plurality of sound data loggers to detect and store sound data, deploying the plurality of sound data loggers along the at least one fluid conveying conduit in a spaced apart relationship, detecting and storing sound data produced within the at least one fluid conveying conduit using the plurality of sound data loggers, retrieving the sound data loggers, and correlating the at least one leak in the at least one fluid conveying conduit using the sound data stored in the plurality of sound data loggers.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the present invention and, together with the description, serve to explain the principles; of the invention. In the drawings wherein like reference numerals represent like parts.

DETAILED DESCRIPTION OF A PREFERRED EMBODIMENT

Figure 1:
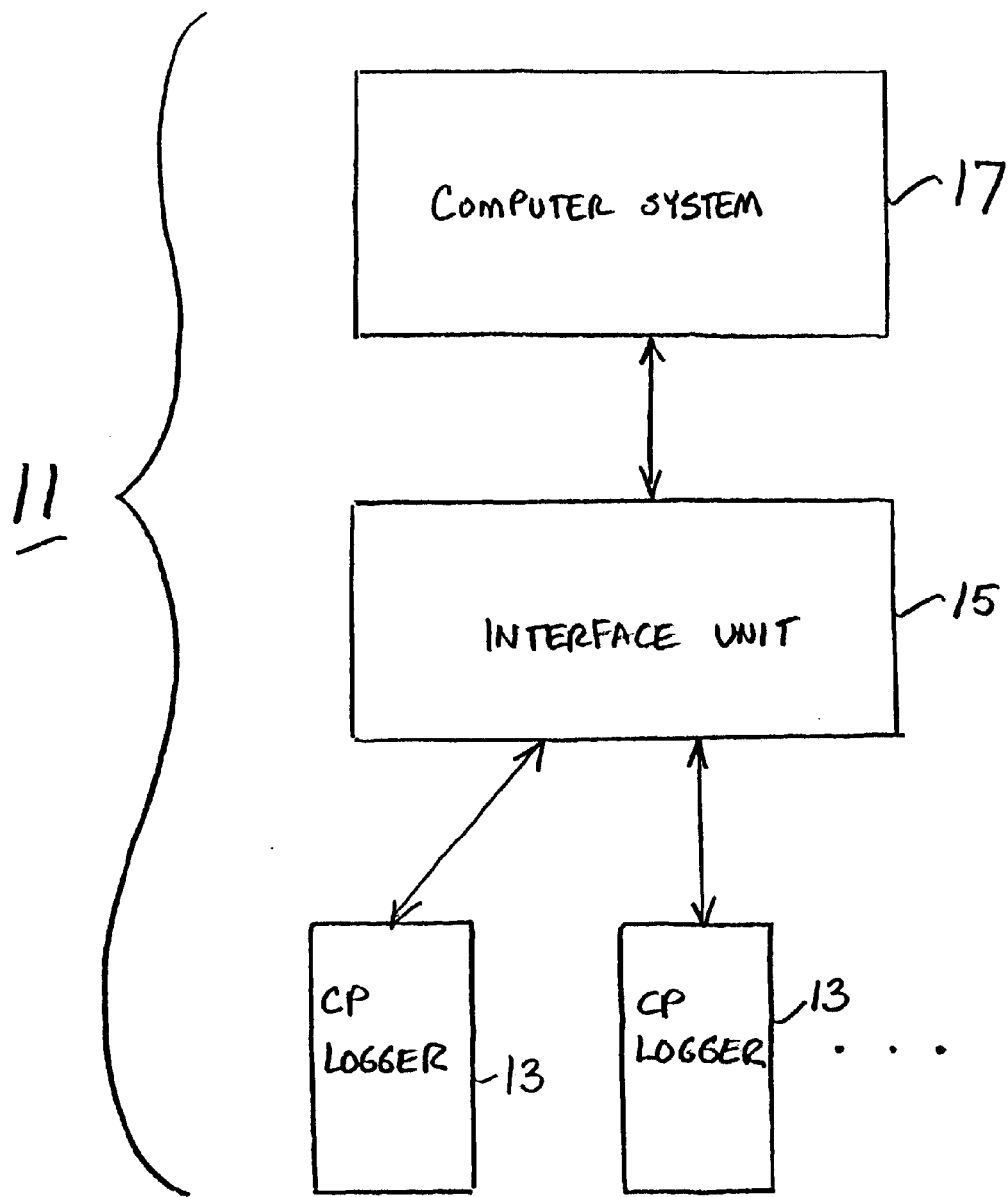
FIG. 1 is a block diagram of a system constructed according to the teachings of the present invention for localizing and correlating one or more leaks in a fluid conveying conduit.

Referring to FIG. 1, there is shown a system constructed according to the teachings of the present invention for localizing and correlating one or more leaks L in a fluid conveying conduit C, such as an underground water pipeline, the system being identified generally by reference numeral 11.

System 11 comprises a plurality of correlator pod (CP) loggers 13 for sensing and recording sound data, an interface unit 15 which is connected to each of the plurality of CP loggers 13 and a computer system 17 connected to interface unit 15 for localizing and correlating the sound data recorded by loggers 13 to determine the location of leaks L present in conduit C.

Figure 2:
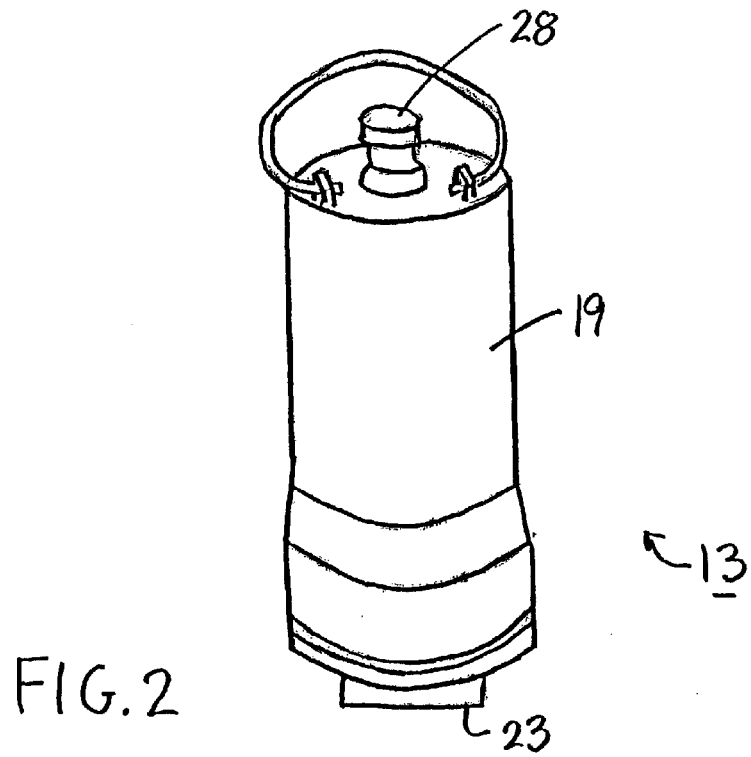
FIG. 2 is a perspective view of one of the loggers shown in FIG. 1.
Figure 3:
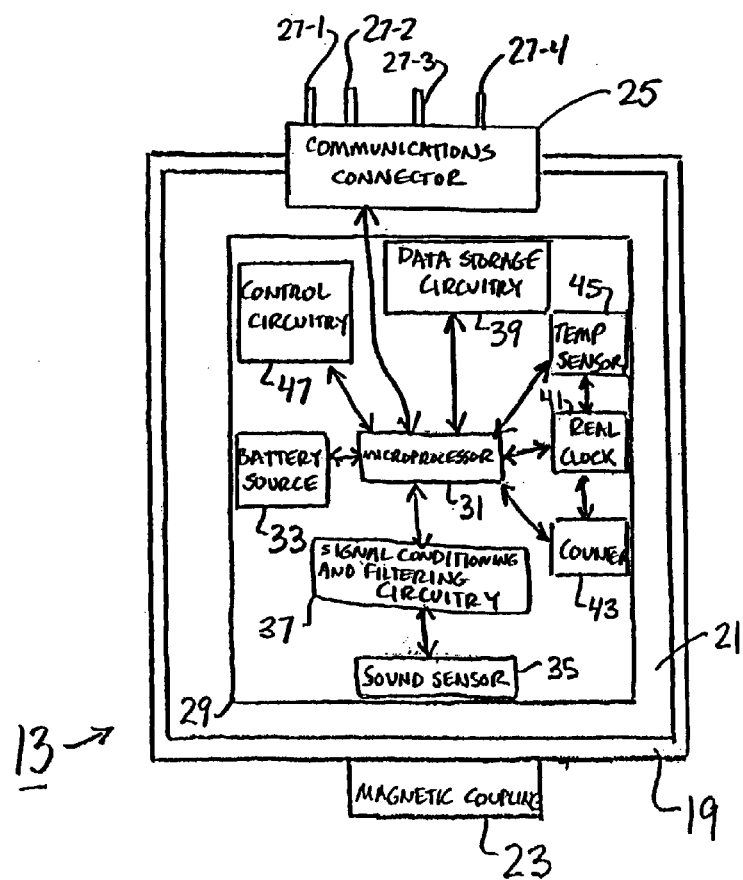
FIG. 3 is a block diagram of the logger shown in FIG. 2.

Referring now to FIGS. 2 and 3, each logger 13 comprises a housing 19 of rugged construction which is shaped to define an enclosed interior cavity 21.

It should be noted that housing 19 is preferably constructed of a die-cast aluminum with a polyester powder paint finish and IP68 protective coating, thereby enabling logger 13 to be fully submersible and pressure tested to at least 3.0 meters (10 feet) of water. However, it is to be understood that logger 13 could be constructed of alternative materials without departing from the spirit of the present invention.

It should also be noted that housing 19 is preferably constructed in a generally cylindrical configuration with a length of approximately 170 mm (6.7 inches) and a diameter of approximately 75 mm (2.95 inches). Furthermore, housing 19 is also preferably constructed so that logger 13 is approximately 0.7 kg (1.54 lbs) in weight and is operable between −10° C. (14° F.) and 50° C. (122° F.). However, it is to be understood that logger 13 could be constructed to have an alternative shape, weight and/or operating temperature range without departing from the spirit of the present invention.

A magnetic coupling 23 is mounted on housing 19. Magnetic coupling 23 enables logger 13 to be simply and securely mounted onto a metallic pipeline or other easily accessible metallic external device, such as a valve or hydrant. Specifically, magnetic coupling 23 enables logger 13 to be easily placed upon the pipeline or external device with the resulting magnetic force retaining logger 13 thereon.

A communications connector 25 is mounted on housing 19 and interconnects logger circuitry disposed within each logger 13 to interface unit 15, as will be described further in detail below. Communications connector 25 is preferably a serial digital communications connector comprising four military pin connectors 27. Specifically, a first military pin connector 27-1 is designated for the transmission of serial communications signals, the serial communications signals preferably running at a baud rate of approximately 115,200. A second military pin connector 27-2 is designated for the receipt of external power from interface unit 15, thereby conserving the battery life of each logger 13. A third military pin connector 27-3 is designated for reset functions for logger 13. A fourth military pin connector 27-4 is designated for a port identification (ID) input, the port ID input being used so that computer system 17 can detect the location and identify the presence of loggers 13 which are connected to interface unit 15. It should also be noted that communications connector 25 preferably includes a cover 28 which can be removably disposed over pin connectors 27, thereby enabling logger 13 to be left unattended, below ground, for a prolonged period of time without any risk of tampering or damage, which is highly desirable.

Logger 13 also comprises electronics 29 for detecting and storing sound data created by fluid conveying conduit, such as frequency sounds created as a result of one or more leaks L. Electronics 29 are disposed within enclosed interior cavity 21 of housing 19 and is connected to communications connector 25.

Electronics 29 comprises a microprocessor, or microcontroller, 31 which controls all aspects of the operation of logger 13. Microprocessor 31 is connected to communications connector 25.

A battery source 33 for powering logger 13 is connected to microprocessor 31. Preferably, battery source 33 is a non-rechargeable, lithium thionyl chloride battery pack which has a life of approximately five years. However, it is to be understood that battery source 33 represents any well-known type of battery pack which would render logger 13 a self-contained unit without departing from the spirit of the present invention. It should be noted that battery source 33 renders logger 13 self-contained in nature, thereby enabling logger 13 to be left unattended, below ground for a prolonged period of time without any risk of tampering or damage. It should also be noted that, with logger 13 connected to interface unit 15, interface unit 15 is capable of providing power to logger 13, thereby conserving battery source 33.

Electronics 29 also comprises a sound sensor 35 for amplifying and detecting sound data. Preferably, sound sensor 35 is in the form of an integral piezo compression accelerometer/input sensor having a frequency range of approximately 5 Hz to 5 KHz. However, it is to be understood that sound sensor 35 represents any well known device for sensing sound, such as a hydrophone, without departing from the spirit of the present invention.

Signal conditioning and filtering circuitry 37 for conditioning and filtering sound data detected by sensor 35 is connected to sensor 35 and, in addition, to microprocessor 31. Preferably, signal conditioning and filtering circuitry 37 includes an adjustable 50/60 Hz notch filter to reduce unwanted high frequencies, such as those high frequencies created from power lines. However, it is to be understood that circuitry 37 could include alternative types of filters without departing from the spirit of the present invention.

It should be noted that circuitry 37 incorporates gain adjustments to ensure that the sound data created by leak L has sufficient amplitude to be measured by sound sensor 35 without saturating circuitry 37. This gain adjustment control operates automatically within logger 13 and uses simple averaging techniques to avoid excessive desensitization due to the presence of random loud peaks of noise signal, which may result from nearby transient shock vibrations. Specifically, gain adjustment is controlled by microprocessor 31, microprocessor 31 setting the gain adjustment to a value appropriate for the sound noise level. A 12 bit analog to digital converter (A/D) is used to convert the sound data detected by sensor 35 to a digital format which, in turn, is then read by microprocessor 31 at rates of up to 5 KHz.

It should also be noted that signal conditioning and filtering circuitry 37 is switched on by microprocessor 31 only when logger 13 is recording sound data, circuitry 37 otherwise being switched off to reduce power consumption.

Data storage circuitry, or random access memory (RAM) circuitry, 39 for storing sound data sensed by sensor 35 is connected to microprocessor 31. Preferably, data storage circuitry 39 has enough memory to store 4.5 minutes of sound recording time which can be pre-programmed into 32 separate recordings, data storage circuitry 39 retaining the data even in the absence of power.

It should be noted that data storage circuitry 39 eliminates the need for expensive and unreliable radio or hardwire connections which are used for on-site, real time correlation. Rather, data storage circuitry 39 enables logger 13 to collect and store sound data such that correlation can be performed at a later time and at a location away from the work site, which is highly desirable.

A real time clock 41 for the time synchronization of multiple loggers 13 is connected to microprocessor 31. Preferably, clock 41 comprises a 32,768 Hz quartz crystal oscillator (not shown) and a conventional clock microprocessor chip (not shown) which operates continuously. The output of the clock microprocessor chip is connected to a 32 bit counter 43, counter 43 being connected to and controlled by microprocessor 31.

It should be noted that clock 41 serves to update clock registers inside the clock microprocessor chip at 1 second intervals and to output a constant frequency. The constant frequency serves to notify microprocessor 31 at regular intervals to increment a watchdog timer (not shown) and to increment counter 43. Upon receiving an interrupt at regular intervals from clock 41, microprocessor 31 determines whether it is time for sensor 35, to be turned on for another recording.

It should also be noted that counter 43 enables for delays in the starting sound recording time of loggers 13, thereby providing more flexibility in the operation of system 11, which is highly desirable. In addition, counter 43 is used to calculate linear drift compensation for clock 41, which will be described further in detail below.

A temperature sensor, or thermistor, 45 is connected to clock 41 and microprocessor 31. As can be appreciated, sensor 45 enables clock 41 to be calibrated to compensate for drift in time due to temperature changes. Specifically, it has been found that, as the ambient temperature changes, internal clock 41 for logger 13 will drift, thereby creating significant calculation errors in the leak correlation process. As such, temperature data collected from sensor 45 is used to compensate for clock drift. It should be noted that, to ensure the accuracy of the temperature data, sensor 45 is mounted directly onto the crystal oscillator of clock 41 because the crystal oscillator is the most temperature sensitive part of clock 41.

A control circuit 47 is connected to microprocessor 31. As can be appreciated, control circuit 47 serves a plurality of functions, such as providing power regulation, battery monitoring and watchdog circuitry. Specifically, control circuit 47 monitors battery source 33 by taking battery voltage and total current consumption measurements. In addition, control circuit 47 provides watchdog circuitry which will reset counter 43 if counter 43 is not cleared by microprocessor 31 at least once every 16 seconds, such as if the program locks up in an undefined program space because of some large electrical disturbances.

In use, logger 13 records sound data produced in fluid conveying conduit C in the following manner. Microprocessor 31 receives an interrupt signal at regular intervals from clock 41 to check whether it is time for the next sound data recording. If microprocessor 31 determines that sound data is to be recorded, microprocessor 31 allows for power from battery source 33 to passed onto signal conditioning and filtering circuitry 37 and sound sensor 35, microprocessor 31 programming all the filters of circuitry 37 with appropriate clock signals, including the 50/60 Hz filter. Sound sensor 35 then reads sound data produced within conduit C. The sound data detected by sensor 35 is then converted to a digital format which is read by microprocessor 31. After having read the sound data, microprocessor 31 calculates and sets an appropriate gain setting for the signal conditioning and filtering circuitry 37. Counter 43 and temperature sensor 45 are then read and recorded in order to compensate for clock drift. Upon compensating for clock drift, further sound data is then sampled at a pre-configured rate set of recording, the sampled sound data being stored in data storage circuitry 39.

Figure 4:
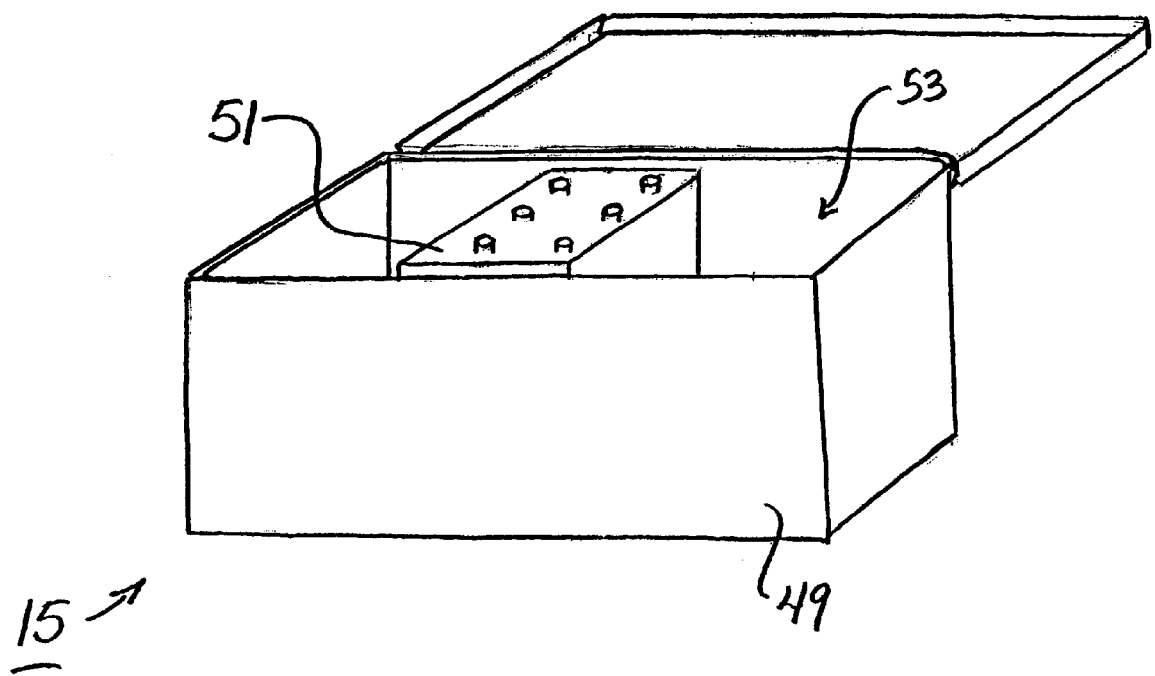
FIG. 4 is a perspective view of the interface unit shown in FIG. 1.

Referring now to FIG. 4, interface unit 15 comprises a carrying case 49 and a logger interface 51 positioned within carrying case 49.

Carrying case 49 is preferably manufactured of a rugged and durable material, such as aluminum and includes an interior cavity 53 which is sized and shaped to receive a plurality of loggers 13 and logger interface 51. Preferably, a lining, such as foam, is disposed within interior 53 to protect loggers 13.

Logger interface 51 is disposed within carrying case 49 and serves to link the plurality of loggers 13 to computer system 17. Logger interface 51 preferably includes an RS232 serial communication link to computer system 17, the link having a 115K Baud rate with data compression. Logger interface 51 also preferably includes an internal rechargeable N-Cad battery (not shown) with a 12 volt DC charger socket for powering logger interface 51.

Computer system 17 is connected to logger interface 51 of interface unit 15 and serves as the user interface during the process of correlating leaks L in conduit C. Computer system 17 preferably meets the following minimum requirements: a 300 MHz microprocessor, 64 MB of RAM, a 6.0 GB hard drive, a 3.5 inch disk drive, a 24×speed CD ROM and a 1,115K Baud serial port. However, it is to be understood that alternative computer systems could be utilized in system 11 without departing from the spirit of the present invention.

Figure 5:
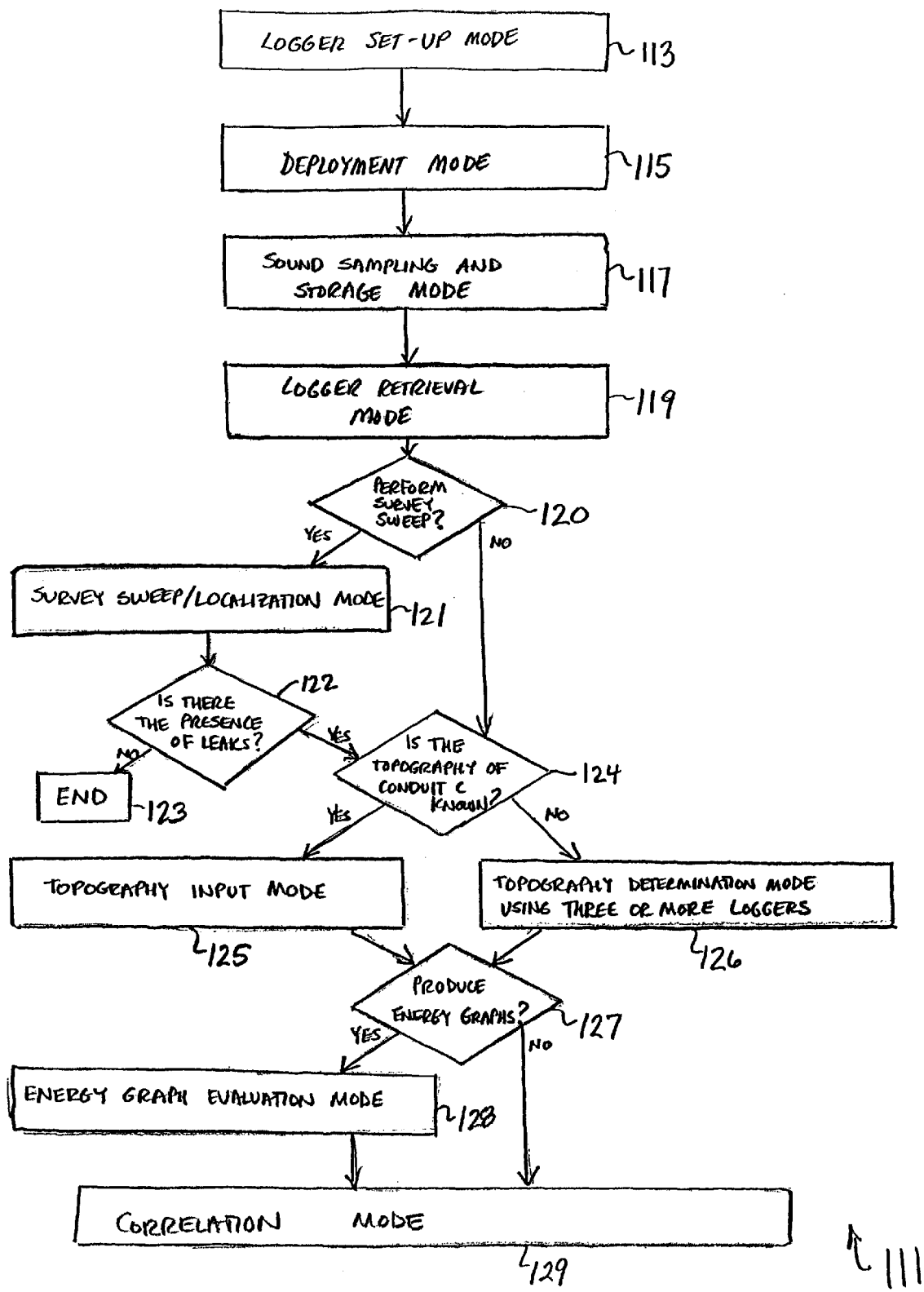
FIG. 5 is a flow chart representing a method for localizing and correlating one or more leaks in a fluid conveying conduit using the system shown in FIG. 1.

Referring now to FIGS. 5, there is shown a method for localizing and correlating one or more leaks L in a fluid conveying conduit C using system 11, the method being identified generally by reference numeral 111. Method 111 will be described initially as using a first CP logger 13-1 and a second CP logger 13-2 for localizing and correlating leaks L in conduit C. However, it is to be understood that additional loggers 13 can be used in method 111 without departing from the spirit of the present invention, as will be described further in detail below.

Method 111 includes a logger set-up mode 113 in which loggers 13-1 and 13-2 are properly set-up for sound data detection and storage. Specifically, loggers 13 are connected to interface unit 15 which, in turn, is connected to computer system 17. With system 11 connected as such, the user interfaces with computer system 17 to time synchronize and configure loggers 13 for a plurality of pre-determined sound recording sessions. Typically, the software loaded on computer system 17 will default the user to configure loggers 13 for a recording session which consists of 1 to 32 periodic recording periods (with 40,000 readings for each recording period) which sample sound data at approximately 4800 samples per second.

It should be noted that method 111 allows for the synchronization of sound data recorded asynchronously by loggers 13-1 and 13-2 to an accuracy of one millisecond, which is highly desirable. Specifically, the synchronization of loggers 13-1 and 13-2 to an accuracy of one millisecond enables method 111 to pinpoint the time difference between signals recorded by the correlating loggers 13, which is a principal object of the present invention.

After loggers 13 have been synchronized and programmed for recording sound data in set-up mode 113, method 111 undertakes a deployment mode 115. Specifically, in deployment mode 115, one logger 13-1 is placed at one position along conduit C and another logger 13-2 is placed at another position along conduit C, loggers 13 being retained onto conduit C by magnetic coupling 23. It should be noted that deployment mode 115 is extremely easy, quick and unobtrusive and can be accomplished either during the day or at night, which is highly desirable.

After deployment mode 115, method 111 includes a sound sampling and storage mode 117. In the sound sampling and storage mode 117, pre-programmed loggers 13 sample and store sound data produced within conduit C in multiple time slices, the multiple readings being used in order to eliminate temporary, non-leak related noise which is produced within conduit C (i.e., because of temporary increases in water usage). As such, the collection of multiple sound data samples allows for the filtration of random noise so as to leave for analysis only continuous sound waves produced by leaks L in conduit C. Typically, a small number of time slices are sufficient (i.e., two or three short recordings of 10 seconds duration) for analyzing metal conduits. However, for other types of conduits, the recording length can be increased. In addition, where ambient noise is too high during the day, pre-selected start times at night can be adopted, using shorter recordings of up to 30 in number.

After sampling and storage mode 117, loggers 113 are collected in a retrieval mode 119. It should be noted that the retrieval of loggers 113 is extremely simple and unobtrusive and can be performed at any time of day. During retrieval mode 119, loggers 13 are connected to logger interface 51 of interface unit 15 which, in turn, is connected to computer system 17. Upon connection, the sound data collected by each logger 13 is downloaded onto computer system 17. As a result, the user can utilize computer system 17 to localize and correlate leaks L in conduit C, as will be described further in detail below.

It should be noted that because loggers 113 are capable of sampling and storing sound data, loggers 13 can be used to localize and correlate leaks L at a later time and in a remote location, thereby eliminating the need for real-time calculations. Accordingly, it should be noted that, because the localization and correlation of leaks L need not be calculated in real-time, method 111 is substantially unobtrusive and easy to use, which is highly desirable.

After retrieval stage 119, the user determines whether to perform an optional survey sweep of conduit C, the decision being represented by reference numeral 120 in FIG. 5.

If the user decides in mode 120 to perform a survey sweep, a survey sweep, or localization, mode 121 is performed to determine the general presence of any leaks L in conduit C. Specifically, the user utilizes computer system 17 to carry out an initial review of sound logging results. The software package will set a default conduit C length and material, carry out a correlation exercise and display an initial set of results. The user is allowed to change the default pipe lengths and materials and then re-correlate. It should be noted that survey sweep mode 121 is optional because the user could alternatively determine the general presence of leaks in conduit C by monitoring the flow of fluid in and out of a district metered area (DMA) for conduit C or by monitoring the minimum night flow of the fluid in conduit C.

Survey sweep mode 121 will determine the general presence of leaks in conduit C, as represented by reference numeral 122. If survey sweep mode 121 determines that no leaks L exist in conduit C, method 111 terminates, as represented by reference numeral 123. To the contrary, if survey sweep mode 121 determines that one or more leaks L exist within conduit C, or if survey sweep mode 121 was bypassed, the user is required to determine if the topography of conduit C is known, as represented by reference numeral 124.

If the topography of conduit C is known, a topography input mode 125 is undertaken. Specifically, in topography input mode 125, the user is required to input accurate information into computer system 17 regarding the distance D between logger 13-1 and logger 13-2, the diameter of conduit C and the particular material of conduit C. It should be noted the topography information can be obtained often from either direct site measurements or GIS plans.

If the topography of conduit C is unknown, a topography determination mode 126 can be performed using the sound data collected by three or more loggers 13. It should be noted that topography determination mode 126 can only be calculated if three or more loggers 13 are used in method 111. Specifically, in topography determination mode 126, when three or more loggers 13 are used, two neighboring loggers, which are positioned on the same side of a leak L and which are spaced apart a known distance, are used to calculate the velocity of sound within the pipeline by measuring the lag in time in which the sound signal is detected by the two loggers.

Once the topography of conduit C is input into computer system 17, the user is required to determine whether to produce optional energy graphs for evaluation, as represented by reference numeral 127. If the user desires to produce optional energy graphs, an energy graph evaluation mode 128 is undertaken. In energy graph evaluation mode 128, the user can investigate in more detail the frequency values obtained from CP loggers 13 during survey sweep mode 121, rather than rely on the default values provided. Specifically, software loaded in computer system 17 allows the user to display individual graphs of energy levels against a sound frequency spectrum, thereby enabling the user to filter out certain frequencies which are not suspected to be generated by a leak.

The final step in method 111 is to perform a correlation mode 129 to accurately determine the exact location of leaks L in conduit C. Correlation mode 129 utilizes the sound data collected by CP loggers 13 to accurately locate the position of one or more leaks L in conduit C.

It should be noted that the novelty in correlation mode 129 pertains to, inter alia, the accuracy in which correlation mode 129 is able to compute the time difference between sound signals recorded by correlating loggers 13 and, as a result, locate the exact location of one or more leaks L in conduit C, as will be described further in detail below.

Figure 6:
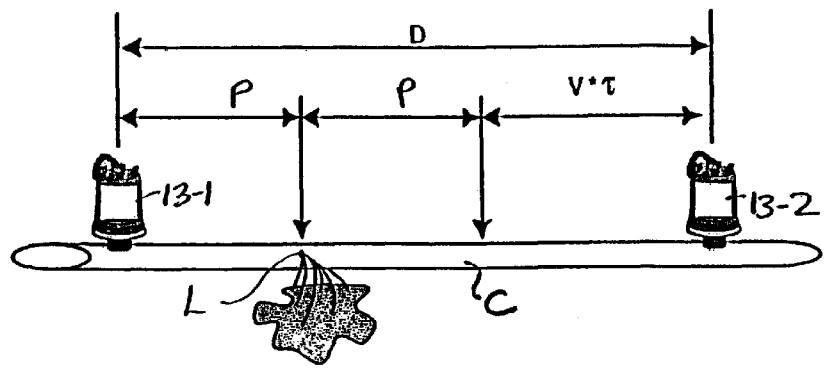
FIG. 6 is a perspective view of a pair of the loggers shown in FIG. 1, the loggers being shown mounted on a fluid conveying conduit on opposite sides of a leak.

Specifically, correlation mode 129 is accomplished in the following manner. Referring now to FIG. 6, with first data logger 13-1 and second data logger 13-2 disposed on conduit C on opposite sides of leak L, loggers 13-1 and 13-2 being spaced apart a distance D, the noise produced by leak L will be detected by first data logger 13-1and second data logger 13-2 at different times. Upon downloading the sound data from loggers 13-1 and 13-2 onto computer system 17, the correlating software in computer system 17 will determine the time difference between when the leak noise signal arrives at data logger 13-1 and when the leak noise signal arrives at data logger 13-2.

It should be noted that the propagation velocity, V, of the leak noise is a constant value and can be calculated by computer system 17 in topography input mode 125. Because propagation velocity V is constant in conduit C in both directions away from leak source L, the exact position P of leak relative to logger 13-1 can be determined using the following equation:

$$P = (D - V \times \tau)/2$$

As noted above, the data logged by each CP logger 13 is downloaded into computer system 17 and correlation mode 129 is performed off line at any time after sampling and storage stage 117. As a result, it should be noted that, the sound data can then be stored on computer system 17 to allow for repeat correlations or comparisons after repair work has been carried out on the site of conduit C, which is highly desirable.

Figure 7:
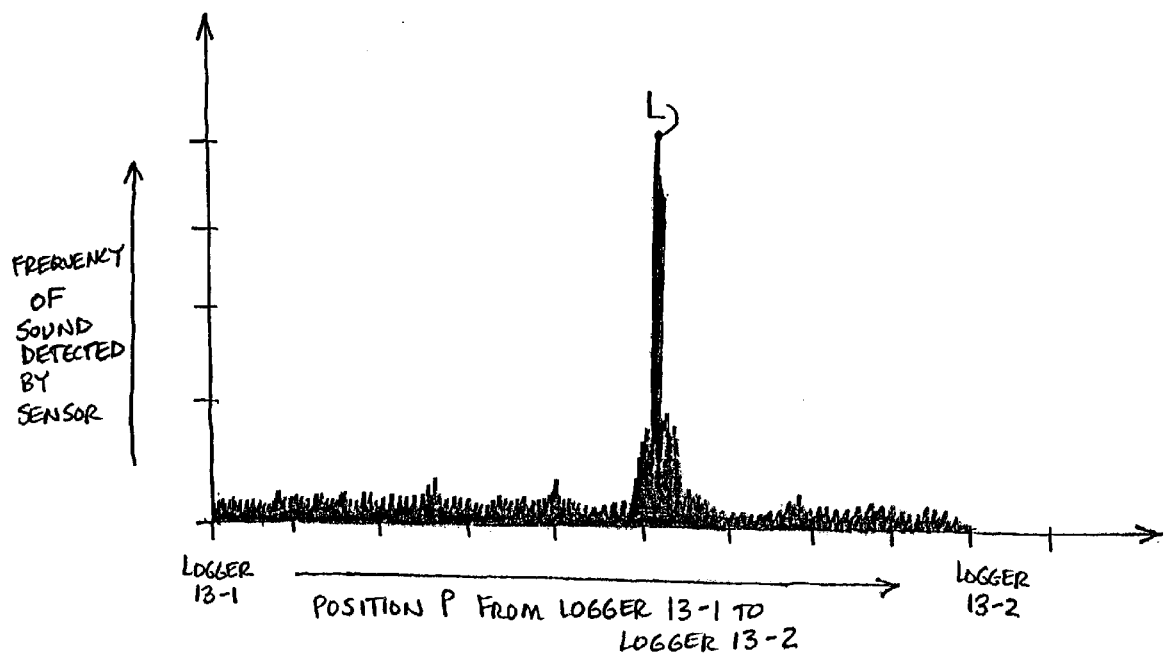
FIG. 7 is a chart useful in determining the location of a leak in a fluid conveying conduit using the method shown in FIG. 5.

In correlation mode 129, the sound data is preferably displayed on a correlation chart of the type shown in FIG. 7. The correlation chart in FIG. 7 displays the relative correlation level of the sound signals detected by loggers 13 as a function of the distance from logger 13-1 to logger 13-2. As shown in the chart, the presence of a leak will produce a considerable frequency spike in the chart, the spike thereby enabling the user to ascertain the exact location of the leak relative to loggers 13, which is highly desirable.

Because, correlation mode 129 is performed off line at a time after sound sampling and storage mode 117, it is essential to synchronize both sets of sound data to the same instant in time to ensure that the correlation is accurate. For example, if the data from one logger is delayed by 10 milliseconds with respect to the other logger, an error in correlating the true location of the leak could occur, which is highly undesirable. Accordingly, the data between multiple loggers is synchronized in time during correlation mode 129 through the synchronization of the real time clock 41 of each logger 13 to an accuracy of one millisecond.

Although method 111 can be performed using two loggers 13, it is to be understood that method 111 could be implemented using additional loggers without departing from the spirit of the present invention.

Figure 8:
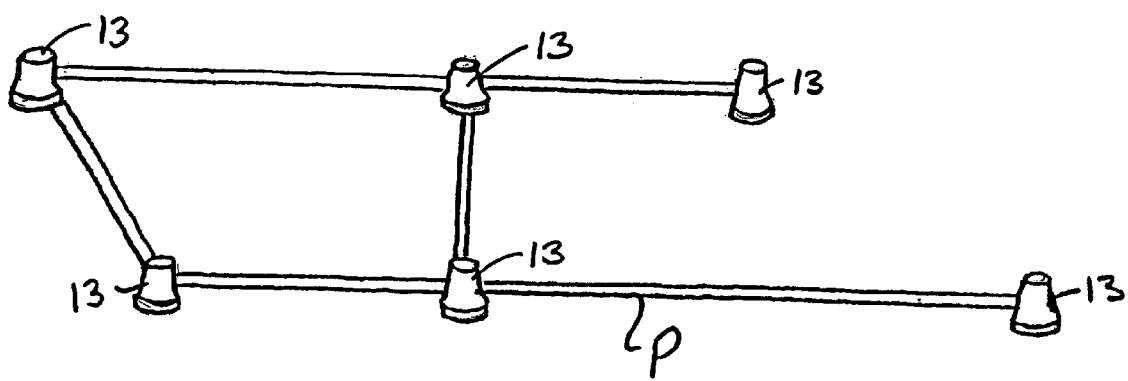
FIG. 8 is a perspective view of a plurality of the loggers shown in FIG. 1, the loggers being shown mounted on a complicated pipeline at various locations.

As an example, method 111 could alternatively utilize three or more CP loggers 13 to localize and correlate a leak L in a conduit C. As a result, the plurality of loggers 13 can be positioned along a complicated pipeline P, as shown in FIG. 8, to accurately determine the source of leaks L formed therein, thereby allowing for the quick and easy surveillance of a large area, which is highly desirable. It should be noted that the use of three or more loggers 13 enables method 111 to be used on a straight line pipe or around "T" joints to determine the location of multiple leaks L.

It should be noted that the use of three or more CP loggers 13 enables for leak noise correlation on a multi-dimensional conduit C. Specifically, loggers 13 can be deployed in parallel on multiple sections of pipe, thereby significantly reducing the number of man-hours required to correlate a leak L in conduit C, which is highly desirable.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for localizing and correlating to pinpoint at least one leak in at least one fluid conveying conduit, said system comprising:

(a) first and second loggers which are positioned along the fluid conveying conduit in a spaced apart relationship, each of said first and second loggers forming a single, self-contained unit, said first and second loggers being adapted to detect and store sound data produced within the at least one fluid conveying conduit, (b) an interface unit removably connected to said first and second loggers, and (c) a computer system removably connected to said interface unit, wherein the sound data stored by said first and second loggers is capable of being downloaded onto said computer system, said computer system being capable of using the sound data to localize and correlate the at least one leak in the at least one conduit.

2. The system of claim 1 wherein said first logger comprises, (a) a housing shaped to define an enclosed interior cavity, and (b) electronics disposed within the interior cavity of said housing for detecting and storing sound data produced within the at least one fluid conveying conduit.

3. The system of claim 2 wherein said first logger comprises a magnetic coupling mounted on said housing for retaining said first logger onto the at least one fluid conveying conduit.

4. The system of claim 2 wherein said first logger comprises a communications connector mounted on said housing, the communications connector being connected to said electronics and said interface unit.

5. The system of claim 2 wherein said electronics comprises, (a) a microprocessor for controlling the operation of said first logger, (b) a battery source connected to said microprocessor for powering said first logger, (c) a sound sensor connected to said microprocessor for detecting sound data produced within the at least one fluid conveying conduit, and (d) data storage circuitry connected to said microprocessor for storing sound data detected by said sound sensor.

6. A logger for use in localizing and correlating at least one leak in at least one fluid conveying conduit, said logger comprising, (a) a housing shaped to define an enclosed interior cavity, and (b) electronics disposed within the interior cavity of said housing for detecting and storing sound data produced within the at least one fluid conveying conduit.

7. The logger of claim 6 further comprising a magnetic coupling mounted on said housing for retaining said first logger onto the at least one fluid conveying conduit.

8. The logger of claim 6 further comprising a communications connector mounted on said housing, the communications connector being electrically connected to said electronics.

9. The logger of claim 6 wherein said electronics comprises, (a) a microprocessor for controlling the operation of said logger, (b) a battery source connected to said microprocessor for powering said logger, (c) a sound sensor connected to said microprocessor for detecting and amplifying sound data produced within the at least one fluid conveying conduit, and (d) data storage circuitry connected to said microprocessor for storing sound data detected by said sound sensor.

10. The method for correlating the at least one leak in at least one fluid conveying conduit using a plurality of sound data loggers, each of said first and second loggers forming a single, self-contained unit, each sound data logger being adapted to detect and store sound data produced within the at least one fluid conveying conduit, said method comprising the steps of:
   (a) programming the plurality of sound data loggers to detect and store sound data,
   (b) deploying the plurality of sound data loggers along the at least one fluid conveying conduit in a spaced apart relationship,
   (c) detecting and storing sound data produced within the at least one fluid conveying conduit using the plurality of sound data loggers,
   (d) retrieving the sound data loggers from the at least one fluid conveying conduit, and
   (e) correlating the at least one leak in the at least one fluid conveying conduit using the sound data stored in the plurality of sound data loggers.

11. The method of claim 10 wherein the correlation step accurately pinpoints the at least one leak in the at least one fluid conveying conduit using the sound data stored in the plurality of sound data loggers.

12. The method of claim 10 wherein the plurality of sound data loggers detect and store data in multiple, predetermined time periods.

13. The method of claim 10 wherein the correlation step and the detecting and storing step are performed at different times.

14. The method of claim 10 further comprising the step of determining the topography of the at least one fluid conveying conduit using the sound data stored in the plurality of sound data loggers.

15. The method of claim 10 wherein the plurality of sound data loggers asynchronously detect and store sound data produced within the at least one fluid conveying conduit.

16. The method of claim 15 wherein the sound data stored by said plurality of sound data loggers can be synchronized to an accuracy of approximately 1 millisecond.

17. A system for localizing and correlating to pinpoint at least one leak in a multi-dimensional fluid conveying conduit having multiple sections, said system comprising:
   (a) a plurality of loggers which are positioned along the multiple sections of the fluid conveying conduit in a spaced apart relationship, said plurality of loggers being adapted to detect and store sound data produced within the fluid conveying conduit,
   (b) an interface unit removably connected to said plurality of loggers, and
   (c) a computer system removably connected to said interface unit, wherein the sound data stored by said plurality of loggers is capable of being downloaded onto said computer system, said computer system being capable of using the sound data to localize and correlate the at least one leak in the fluid conveying conduit.

18. A system for localizing and correlating to pinpoint at least one leak in at least one fluid conveying conduit, said system comprising:
   (a) first and second loggers which are positioned along the fluid conveying conduit in a spaced apart relationship, said first and second loggers being adapted to detect and store sound data produced within the at least one fluid conveying conduit, said first logger comprising,
       (i) a housing shaped to define an enclosed interior cavity, and
       (ii) electronics disposed within the interior cavity of said housing for detecting and storing sound data produced within the at least one fluid conveying conduit, said electronics comprising,
           (A) a microprocessor for controlling the operation of said first logger,
           (B) a battery source connected to said microprocessor for powering said first logger,
           (C) a sound sensor connected to said microprocessor for detecting sound data produced within the at least one fluid conveying conduit,
           (D) data storage circuitry connected to said microprocessor for storing sound data detected by said sound sensor,
           (E) signal conditioning and filtering circuitry for conditioning and filtering sound data detected by said sound sensor, said sound sensor being connected to said microprocessor through said signal conditioning and filtering circuitry,
           (F) a real time clock connected to said microprocessor,
           (G) a counter connected to said real time clock and said microprocessor, and
           (H) a temperature sensor connected to said real time clock and said microprocessor,
   (b) an interface unit removably connected to said first and second loggers, and
   (c) a computer system removably connected to said interface unit, wherein the sound data stored by said first and second loggers is capable of being downloaded onto said computer system, said computer system being capable of using the sound data to localize and correlate the at least one leak in the at least one conduit.

19. A logger for use in localizing and correlating at least one leak in at least one fluid conveying conduit, said logger comprising:
   (a) a housing shaped to define an enclosed interior cavity, and
   (a) electronics disposed within the interior cavity of said housing for detecting and storing sound data produced within the at least one fluid conveying conduit, said electronics comprising,
       (i) a microprocessor for controlling the operation of said logger,
       (ii) a battery source connected to said microprocessor for powering said logger,
       (iii) a sound sensor connected to said microprocessor for detecting and amplifying sound data produced within the at least one fluid conveying conduit,
       (iv) data storage circuitry connected to said microprocessor for storing sound data detected by said sound sensor,
       (v) signal conditioning and filtering circuitry for conditioning and filtering sound data detected by said sound sensor, said sound sensor being connected to said microprocessor through said signal conditioning and filtering circuitry,
       (vi) a real time clock connected to said microprocessor,
       (vii) a counter connected to said real time clock and said microprocessor, and
       (viii) a temperature sensor connected to said real time clock and said microprocessor.

* * * * *